United States Patent [19]

Temme et al.

[11] Patent Number: 4,624,362
[45] Date of Patent: Nov. 25, 1986

[54] CHANNEL SECTIONS FOR SCRAPER-CHAIN CONVEYORS

[75] Inventors: Helmut Temme, Waltrop; Gunther-Dietmar Schoop, Ottmarsbocholt; Hartmut Schewinski, Kamen-Westick, all of Fed. Rep. of Germany

[73] Assignee: Gewerkschaft Eisenhytte Westfalia, Fed. Rep. of Germany

[21] Appl. No.: 698,719

[22] Filed: Feb. 6, 1985

[30] Foreign Application Priority Data

Feb. 20, 1984 [DE] Fed. Rep. of Germany ....... 3405986

[51] Int. Cl.$^4$ ............................................. B65G 19/28
[52] U.S. Cl. ................................. 198/735; 198/860.3
[58] Field of Search ...................... 198/735, 727, 860.3; 299/34, 43

[56] References Cited

U.S. PATENT DOCUMENTS

| 3,842,966 | 10/1974 | Blumenthal et al. | 198/735 |
| 4,282,968 | 8/1981 | Temme | 198/735 |
| 4,359,154 | 11/1982 | Temme | 198/735 |

FOREIGN PATENT DOCUMENTS

| 935779 | 10/1955 | Fed. Rep. of Germany | 198/735 |
| 1518097 | 3/1968 | France | 198/735 |
| 711311 | 6/1954 | United Kingdom | 198/735 |
| 768559 | 2/1957 | United Kingdom | 198/735 |
| 1405095 | 9/1975 | United Kingdom | 198/735 |
| 1483593 | 8/1977 | United Kingdom | 198/735 |

Primary Examiner—Joseph E. Valenza
Assistant Examiner—Jonathan D. Holmes
Attorney, Agent, or Firm—Sughrue, Mion, Zinn, Macpeak & Seas

[57] ABSTRACT

A pan for a scraper-chain conveyor has sigma-shaped side walls and a floor plate extending between inwardly facing central flanges of the side walls. An opening is provided in the pan which interrupts the floor plate and an upper region of one of the side walls. A detachable unit is then inserted into the opening to close the latter. The unit has a plate portion matching the floor plate and a side portion matching the upper region of the interrupted side wall. A support on the outside of this side wall engages with a bar carried by the unit. To lock the unit in place securing which acts solely on the side portion and the remaining side wall of the pan is used.

11 Claims, 6 Drawing Figures

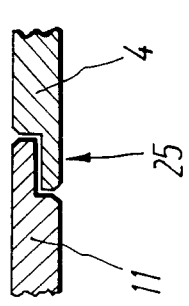
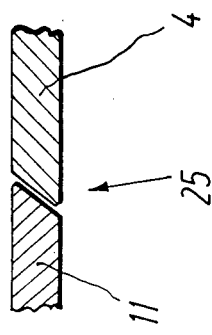
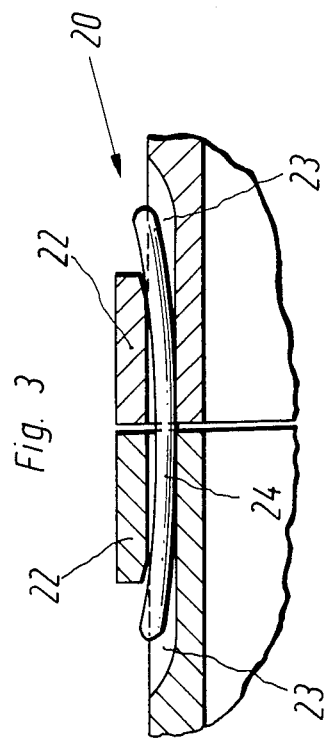
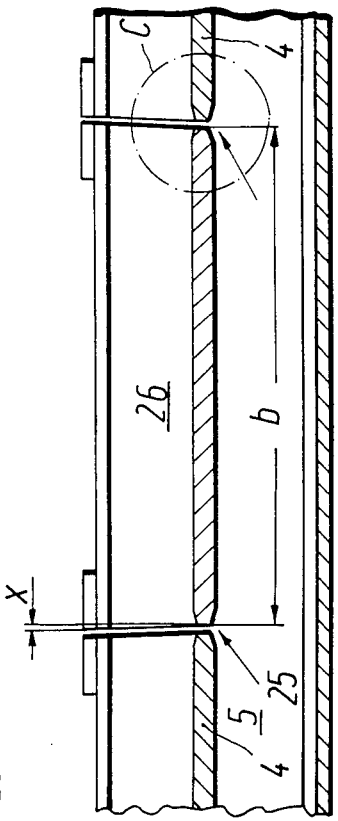

ENGLISH PATENT
4,624,362

CHANNEL SECTIONS FOR SCRAPER-CHAIN CONVEYORS

FIELD OF THE INVENTION

The present invention relates in general to scraper-chain conveyors for use in mining installations and more particularly to channel sections or pans for use in such conveyors.

BACKGROUND TO THE INVENTION

It is well known to construct a scraper-chain conveyor from a series of channels sections or pans joined end-to-end and to circulate a scraper chain assembly along the pans. Each pan can be composed from two shaped, e.g. sigma-shaped, side walls interconnected by a central floor plate. In some cases additional base plates are fitted between lower flanges of the side walls to close off the lower run of the conveyor. To permit access to the lower run it is also known to provide an opening in the floor plate of one or more of the pans and to use detachable plates inset in the openings to close these openings. German patent specification No. 1258333 describes one known construction of this type. The detachable insert plate can be secured in place by means of screws, pins, springs shackles or the like. In the known constructions, the securing means is located on or at the floor plate. During operation of the conveyor, the floor plate is normally subjected to wear which tends to reduce its thickness. The securing means then becomes prone to wear and after a period of time the insert plate cannot be reliably held in place. Moreover, when it is desired to open the access opening by removing the insert plate this can be problematic because the securing means may have suffered wear and/or become blocked by briquetted finings or by corrosion. A general object of the present invention is to provide an improved form of conveyor channel section.

SUMMARY OF THE INVENTION

According to the invention, a channel section or pan for a scraper-chain conveyor is composed of a pair of shaped side walls with a floor plate therebetween and an opening in the channel section closed by means of detachable insert means. In accordance with the invention the opening interrupts the floor plate and one of the side walls. The insert means then comprises a first portion which mates with the remainder of the floor plate and a second portion which mates with the upper region of the remainder of the interrupted side wall. When in place the insert means preserves the continuity of the floor plate and the one side wall. The insert means is locked in place by securing means which acts on, or locates with, the second portion of the insert means. Conveniently, the first and second portions of the insert means are integral. Unlike prior constructions the securing means will be unaffected by wear or impact on the floor plate and the corresponding first portion of the insert means.

The opening may be of substantial size permitting good access to the lower run when the insert is removed. The first portion of the insert may have a dimension transversally of the channel section greater than that of the floor plate. The other of the side walls may then have a recess aligned with the opening which receives an end region of the first portion. To facilitate the location of the insert in the opening, an end region of the first portion which locates in the recess may have an inclined or bent-up extremity. The other dimension of the insert, that is longitudinally of the channel section, may be tapered to be minimal at the first portion and to increase over the section portion to a maximum at an upper flange thereof. This measure also facilitates the fitting of the insert.

The upper flange of the insert together with the upper flange portions of the side wall interrupted by the opening may have shallow recesses covered by plates which receives spring strips acting as the securing means. A securing means of this preferred variety is particularly reliable and because of its location is not prone to wear nor does it impede accessories built onto the conveyor.

The first portion of the insert may engage with stepped or angled-off surfaces with the remainder of the floor plate of the pan. The end regions of the first portion may be bevelled alternatively or additionally to provide a smooth profile and avoid collisions with the scrapers of the scraper-chain assembly.

A bracket fixed to the side wall of the channel section interrupted by the opening may engage with a bar or the like fixed to the second portion of the insert means. The bracket then supports the insert means and ensures it is aligned at the correct height. This is advantageous since it enables adjustment to be effected to take account of tolerances. Moreover, since the insert would normally be fabricated by cutting out the desired profile from a complete pan there is usually a loss of material—typically about 3 mm which can be taken up by appropriate location of the support means.

The invention may be understood more readily, and various other aspects and features of the invention may become apparent, from consideration of the following description.

BRIEF DESCRIPTION OF DRAWINGS

Embodiments of the invention will now be described, by way of examples only, with reference to the accompanying drawings, wherein:

FIG. 3 is a sectional side view of part of the channel section, the view being taken along the line A—A of FIG. 2;

FIG. 4 is a sectional side view of part of the channel section, the view being taken along the line B—B of FIG. 2;

FIG. 5 depicts a modified version of the region shown in the circle C in FIG. 4; and FIG. 6 depicts another modified version of the region shown in the circle C in FIG. 4.

DESCRIPTION OF PREFERRED EMBODIMENTS

Figure 1:
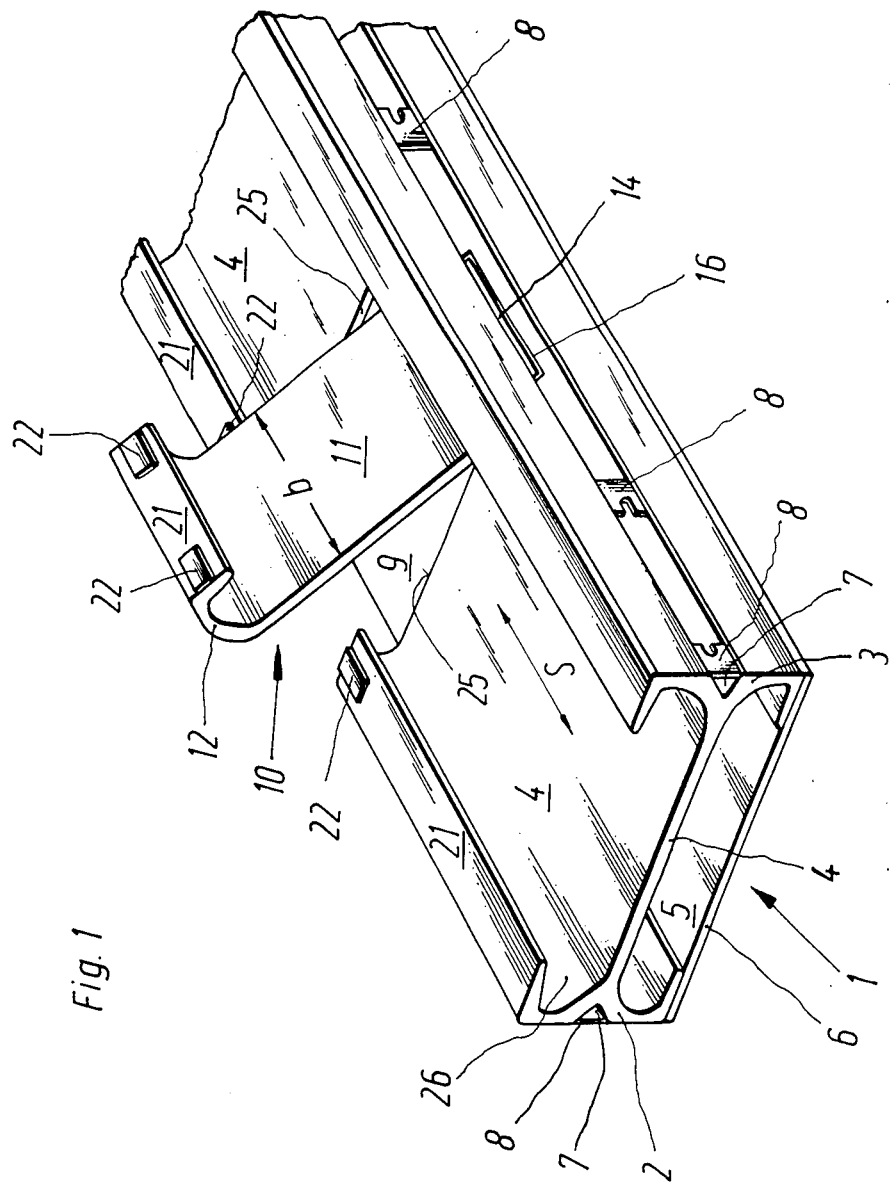
FIG. 1 is a perspective view of part of a channel section for a scraper-chain conveyor constructed in accordance with the invention.

FIG. 1 depicts a channel section or pan 1 for a scraper-chain conveyor. As is known per se, the pan 1 is composed of a pair of generally sigma-shaped side walls 2, 3 with a floor plate 4 fixed therebetween. The floor plate 4 is welded to inwardly-projecting central flanges of the side walls. The side walls 2, 3 also have upper and lower inwardly-directed flanges and the upper flange of the side wall 2 is denoted 21. A series of such pans 1 are arranged end-to-end and a scraper-chain assembly is circulated along the pans 1 to transfer material along the pans 1 as represented by arrows S. The scraper-chain assembly moves along the pans 1 in upper and lower runs. In FIG. 1, the lower run is denoted by reference numeral 5 and the upper run by reference numeral 26. A base plate 6 welded between the lower flanges of the side walls 2, 3 of each pan 1 serves to close off the lower run 5 of the conveyor. The side walls 2, 3 of each pan 1 have central V-shaped grooves 7 extending longitudinally at their external surfaces. Holders 8 are fixed into these grooves 7 to permit attachments, such as barrier plates, to be secured to the side walls 2, 3.

Figure 2:
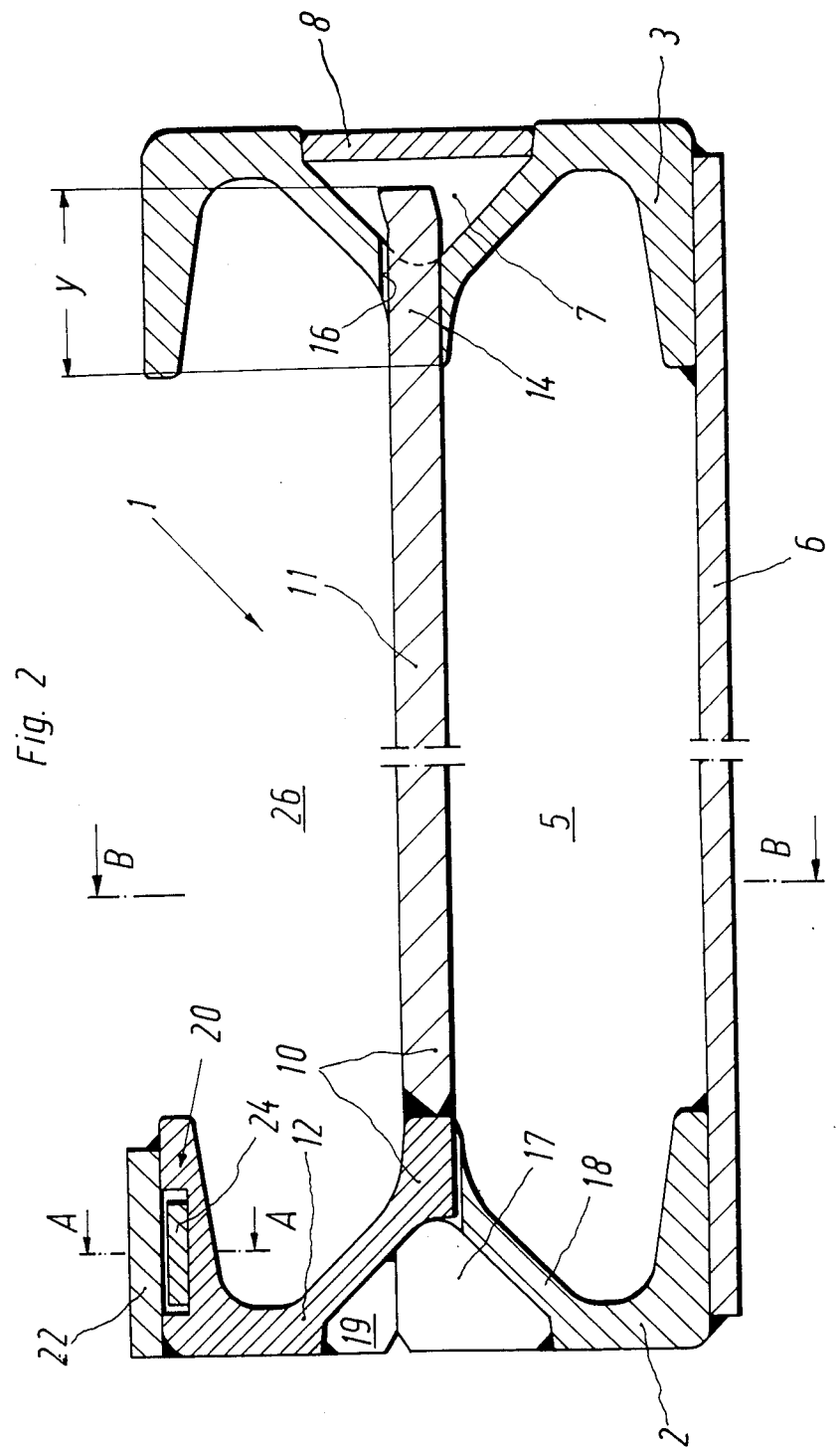
FIG. 2 is a cross-section through the channel section shown in FIG. 1, the view being taken on a somewhat larger scale.

At about the centre of the pan 1 there is a window-like rectangular opening 9 interrupting and penetrating the upper flange 21 of the side wall 2 and the floor plate 4 which receives a closure insert 10. The insert 10 is a one-piece component composed of a floor plate portion 11 and a side portion 12. The plate portion 11 is designed to match the floor plate 4 of the pan 1 while the side portion 12 is designed to match the upper region of the side wall 2. The insert 10 can be cut-out from a complete pan 1. As shown in FIG. 2 with the insert 10 or unit 10 in place, the continuity of the floor plate 4 and side wall 2 is largely maintained but the unit 10 can be removed to provide access at least to the lower run 5. As also shown in FIG. 2, the V-shaped groove 7 in the side wall 2 locates a support or bracket 17 welded to the lower profile 18 of the side wall 2 over a region corresponding to the opening 9. A bar 19 similarly welded to the side portion 12 of the insert 10 abuts and rests on this bracket 17 when the insert 10 is positioned to close the opening 9.

As represented in FIGS. 1 and 4 by reference 'b' the dimension of the plate portion 11 taken longitudinally of the pan 1 is progressively increased by distance 'x' at the upper flange 21 of the side portion 12. As represented in FIG. 2, the dimension of the plate portion 11 taken transversally of the pan 1 is greater by distance 'y' than the floor plate 4 itself. The side wall 3 has a recess 16 which receives the correspondingly projecting end region 14 of the plate portion 11. As also shown in FIG. 2, part of the projecting end region 4 of the plate portion 11 is bent upwards by an angle of about 15°. This aids in fitting the insert or unit 10 into the opening by locating the end region 14 first at an angle in the recess 16 and swinging the insert 10 about the side wall 3 as represented in FIG. 1 to engage the bar 19 on the support 17.

To secure the insert 10 in the closure position securing means 20 is provided. This securing means 20 takes the form of plates 22 welded onto the portions of the upper flange 21 of the side wall 2 adjacent the opening and, correspondingly, on the upper flange 21 of the side portion 12. The plates 22 overlie milled-in recesses 23 (FIG. 3) in the respective upper flanges 21. Spring strips 24 located beneath the aligned plates 22 can be driven in or out, for example, by striking with a tool, to lock or release the unit 10.

FIG. 4 shows the facing regions 25 of the plate portion 12 and the floor plate 4 to be bevelled. FIGS. 5 and 6 depict alternative arrangements where the regions 25 are stepped (FIG. 5) or angled-off (FIG. 6).

We claim:

1. A channel section for a scraper-chain conveyor; said channel section comprising one-piece shaped side walls and a floor plate extending centrally therebetween, a generally L-shaped opening in the channel section which extends over a part of the floor plate and an upper part of one of the side walls above said part of the floor plate, said opening being closed by means of detachable insert means, said insert means comprising a first portion matching the part of the floor plate to preserve the continuity of said floor plate and a second portion matching the upper part of said one side wall to preserve the continuity of the upper region of the side wall and detachable securing means for securing the insert means in place, the securing means locating solely with said second portion of the insert means.

2. A channel section according to claim 1, wherein the first portion of the insert means has a dimension transversally of the channel section greater than that of the floor plate and the other of the side walls has a recess aligned with the opening which receives an end region of the first portion.

3. A channel section according to claim 2, wherein the end region of the first portion of the insert means is at least partly bent upwardly, in relation to the floor plate when the insert means is located in place to close the opening, to facilitate fitting of the insert means.

4. A channel section according to claim 1, wherein the securing means which locks the insert means in the opening is located at an upper flange of said one side wall and of the second portion of the insert means.

5. A channel section according to claim 4, wherein the securing means comprises spring strips engaged in recesses in the flanges beneath aligned plates thereon.

6. A channel section according to claim 1, wherein the first portion of the insert means has a dimension longitudinally of the channel section which progressively increases towards the second portion to a maximum at an upper flange of the second portion.

7. A channel section according to claim 1 and further comprising interengageable stop means on the second portion of the insert means and the exterior of said one side wall.

8. A channel section according to claim 1, wherein the side walls have central V-shaped grooves in their exteriors and said one side wall has a bracket in its V-shaped groove which engages with a bar on the exterior of the second portion of the insert means.

9. A channel section according to claim 1, wherein facing end regions of the floor plate and the first portion of the insert means are bevelled.

10. A channel section according to claim 1, wherein facing end regions of the floor plate and the first portion of the insert means abut via angled-off end regions.

11. A channel section according to claim 1, wherein facing end regions of the floor plate and the first portion of the insert means abut via stepped end regions.

* * * * *